(12) United States Patent
Barkai et al.

(10) Patent No.: US 8,417,447 B2
(45) Date of Patent: Apr. 9, 2013

(54) METHOD AND SYSTEM FOR VISUALIZING SHARED ROUTE INFORMATION

(75) Inventors: Gilad Barkai, Haifa (IL); Nadav Har'El, Haifa (IL); Haggai Roitman, Haifa (IL)

(73) Assignee: International Business Machines Corporation, Armonk, NY (US)

(*) Notice: Subject to any disclaimer, the term of this patent is extended or adjusted under 35 U.S.C. 154(b) by 730 days.

(21) Appl. No.: 12/581,138

(22) Filed: Oct. 18, 2009

(65) Prior Publication Data

US 2011/0093188 A1    Apr. 21, 2011

(51) Int. Cl.
*G01C 21/00* (2006.01)
(52) U.S. Cl. .......................................... 701/410
(58) Field of Classification Search .............. 701/400, 701/409–411, 418, 420, 424–425, 428–430
See application file for complete search history.

(56) References Cited

U.S. PATENT DOCUMENTS

| 6,061,629 A | 5/2000 | Yano et al. | |
| 6,292,745 B1 * | 9/2001 | Robare et al. | 701/409 |
| 7,474,960 B1 | 1/2009 | Nesbitt | |
| 2007/0162224 A1 * | 7/2007 | Luo | 701/210 |
| 2009/0048771 A1 * | 2/2009 | Speier et al. | 701/200 |

* cited by examiner

*Primary Examiner* — Kim T Nguyen

(57) ABSTRACT

A method and system for visualizing shared route information are provided. The method includes receiving a route query from a user and retrieving multiple route results for the query for display as an overlay on a map. The method further includes processing the route results for display by dividing each route result into sub-routes, wherein a sub-route is a portion of a route between intersections with other routes and aggregating the sub-routes across the route results. Each sub-route in the route results is scored according to a defined scoring basis and represented in the display according to the relative score to other sub-routes. A user can select a displayed sub-route and the method filters the route results to remove any routes not including the selected sub-route and displays the narrowed results.

20 Claims, 7 Drawing Sheets

METHOD AND SYSTEM FOR VISUALIZING SHARED ROUTE INFORMATION

FIELD OF THE INVENTION

This invention relates to the field of navigation of map routes. In particular, the invention relates to visualizing shared route information.

BACKGROUND OF THE INVENTION

Collaborative content for route planning on maps is maintained by web sites such as GoogleMaps (GoogleMaps is a trade mark of Google, Inc.), OpenStreetMap (http://www.openstreetmap.org) (OpenStreetMap is a trade mark of OpenStreetMap Foundation), Sanoodi (http://www.sanoodi.com) (Sanoodi is a trade mark of Sanoodi Ltd), Wayfaring (http://www.wayfaring.com) (Wayfaring is a trade mark of Wayfaring Media) and others.

These web sites allow users either to input their routes manually or upload their recorder GPS (Global Positioning System) data for public benefit. Travellers planning their trip, search the data, choosing which route to choose. Merchants (for example, gas stations, souvenir shops, hotels) use this data to select the best locations for their business.

SUMMARY OF THE INVENTION

According to a first embodiment of the present invention there is provided a method for visualizing shared route information, comprising: receiving a query from a user; retrieving multiple route results for the query for display as an overlay on a map; dividing each route result into sub-routes, wherein a sub-route is a portion of a route between intersections with other routes; aggregating the sub-routes across the route results; scoring each sub-route in the route results according to a defined scoring basis; and representing each sub-route in the display according to the relative score to other sub-routes; wherein receiving, retrieving, dividing, aggregating, scoring and representing steps are implemented in either of: a) computer hardware configured to perform said identifying, tracing, and providing steps; and b) computer software embodied in a non-transitory, tangible, computer-readable storage medium.

According to a second embodiment of the present invention there is provided a computer program product for visualizing shared route information, the computer program product comprising: a computer readable medium; computer program instructions operative to: receive a query from a user; retrieve multiple route results for the query for display as an overlay on a map; divide each route result into sub-routes, wherein a sub-route is a portion of a route between intersections with other routes; aggregate the sub-routes across the route results; score each sub-route in the route results according to a defined scoring basis; and represent each sub-route in the display according to the relative score to other sub-routes; wherein said program instructions are stored on said computer readable medium.

According to a third embodiment of the present invention there is provided a system for visualizing shared route information, comprising: a processor; a data repository storing map and route information; a computer-based query input mechanism to retrieve route results from the repository; a dividing mechanism for dividing each route into sub-routes, wherein a sub-route is a portion of a route between intersections with other routes; a scoring mechanism for aggregating and scoring sub-routes in the route results according to a defined scoring basis; and a display mechanism including representing each sub-route in the display according to the relative score to other sub-routes; wherein any of said data repository, route query input mechanism, dividing mechanism, scoring mechanism and display mechanism are implemented in either of computer hardware or computer software and embodied in a non-transitory, tangible, computer-readable storage medium.

According to a fourth embodiment of the present invention there is provided a user interface for visualizing shared route information, comprising: a query input; a map; an overlay of route result information, wherein routes are divided into sub-routes, wherein a sub-route is a portion of a route between intersections with other routes; and wherein each sub-route is represented according to its score relative to other sub-routes; a user selection mechanism for selecting a sub-route to filter results based on the selected sub-route to limit the overlay of route information; wherein the user interface is implemented in either or computer hardware or computer software and embodied in non-transitory, tangible, computer-readable storage medium.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described which provide visualization of aggregated routes or tracks on a map in a collaborative planning environment, providing the user with an easy way to view the aggregated results with a single gaze. It also provides the ability to narrow or drill down the search into routes with a single click on a common sub-route.

This replaces the need for viewing each route separately, helping the user understand the results without going through each and every one of them. Moreover, narrowing the result routes with a single click clarifies what the user is looking for without additional input.

Since such route content is generated by many users ("knowledge of the crowd"), the method and system provide new search services based on such collaborative knowledge, utilizing a tag-cloud idea, similar to the way tags enabled easy navigation and knowledge sharing of regular content on the web. A "route-cloud" is provided enabling visualization, easy navigation, drill down, and knowledge sharing of map routes.

A route-cloud is defined as a visual presentation of user-generated routes over a map. The visual presentation describes sub-routes' rank with different line representations such as colour and/or line properties.

A sub-route is a continuous section in a route. A sub-route may be used by multiple routes. A route is divided into sub-routes or fragments as it intersects with other routes. The route-cloud is then made up of many unique sub-routes. Even though one or many routes can share the same sub-route, the sub-route appears only once in the route-cloud.

Figure 1A:
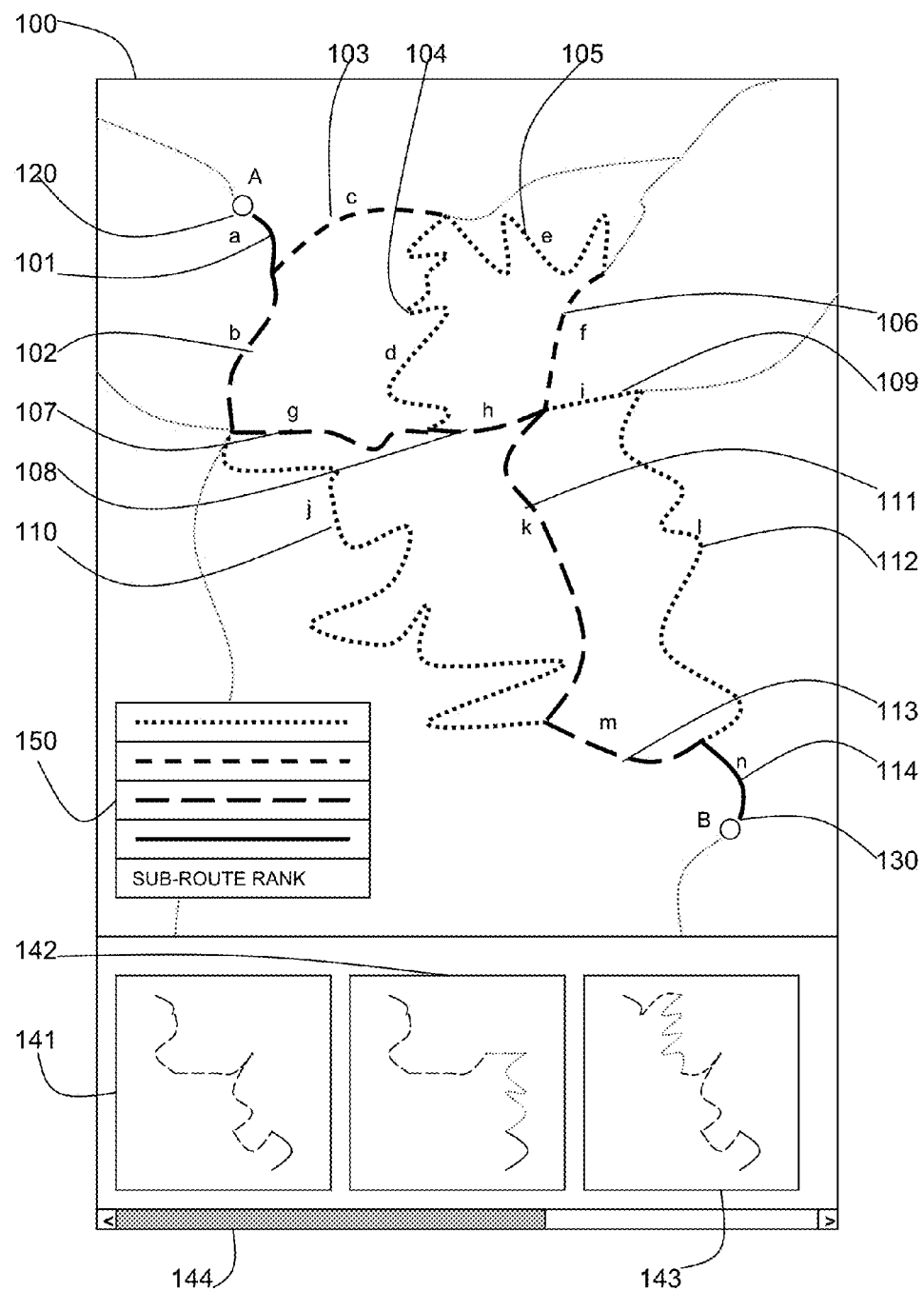
FIG. 1A is a representation of a display showing a visualization of shared routes in accordance with the present invention.

Referring to FIG. 1A, a representation of a display 100 is shown which illustrates the route-cloud visualization of user-generated routes overlaid over a map 140.

As an example, the display 100 shows results of a user query for routes between points A 120 and B 130. Routes between points A 120 and B 130 are divided into sub-routes a 101, b 102, c 103, d 104, e 105, f 106, g 107, h 108, i 109, j 110, k 111, l 112, m 113 and n 114. A sub-route is defined as a part of a route between intersections with other routes. Therefore, a sub-route is a non-intersected path within a route. Each sub-route is used by one or more routes.

In the illustrated example, there are many routes between points A 120 and B 130. An example selection of routes are formed by the sub-routes: abjmn, abghkmn, acdhkmn, abghiln, etc.

The results of a route enquiry between point A 120 and point B 130 are collected from shared routes and added together or aggregated. The sub-routes are represented according to the aggregated results.

The representation of the sub-routes is visualized by relevance to a defined basis of a scoring function. Different scoring bases can be defined in the system and a user can change the scoring basis as required. The scores of the results are represented by a weighting or range of the representation of the sub-routes. The scores may be aggregated according to the number of routes that include the sub-route.

For example, if the scoring basis were to be the popularity of a sub-route, sub-routes such as a 101 and n 114 in FIG. 1A which are used by all routes are represented in one extreme of the form of representation, and obscure routes such as e 105 are represented at the other extreme of the form of representation. Other example scoring bases are described further below.

Example forms of ranges of representation include the following:
  Dashing of lines, as used in FIG. 1A, with the longest dashes used for one extreme and the shortest dashes for the other extreme.
  Colour of lines (for example, red as important and blue as less important).
  Saturation/opacity of colour or transparency level.
  Width of line (wide/thin, bold/lighter).
  Style of line (Continuous/dashed/double/triple).
  Presenting a label next to the sub-route (for example, a numeric score such as a real number in the range of 0 to 1 that appears in the middle of the sub-route).
  A combination of these effects, for example, a popular sub-route (shared by many routes) may be green, heavy and continues, while a non-popular sub-route may be red, light and dashed.

A key 150 to the different line representations for sub-routes is provided.

Individual route results 141-143 are optionally displayed next to the main map to illustrate clearly a route between the points A 120 and B 130. The individual route results 141-143 may be ranked by a function. For example, the individual route results 141-143 may be ranked by summing the scores of their sub-routes or by a rank based on their total distance. A slide bar 144 may be used to display further individual route results.

Figure 1B:
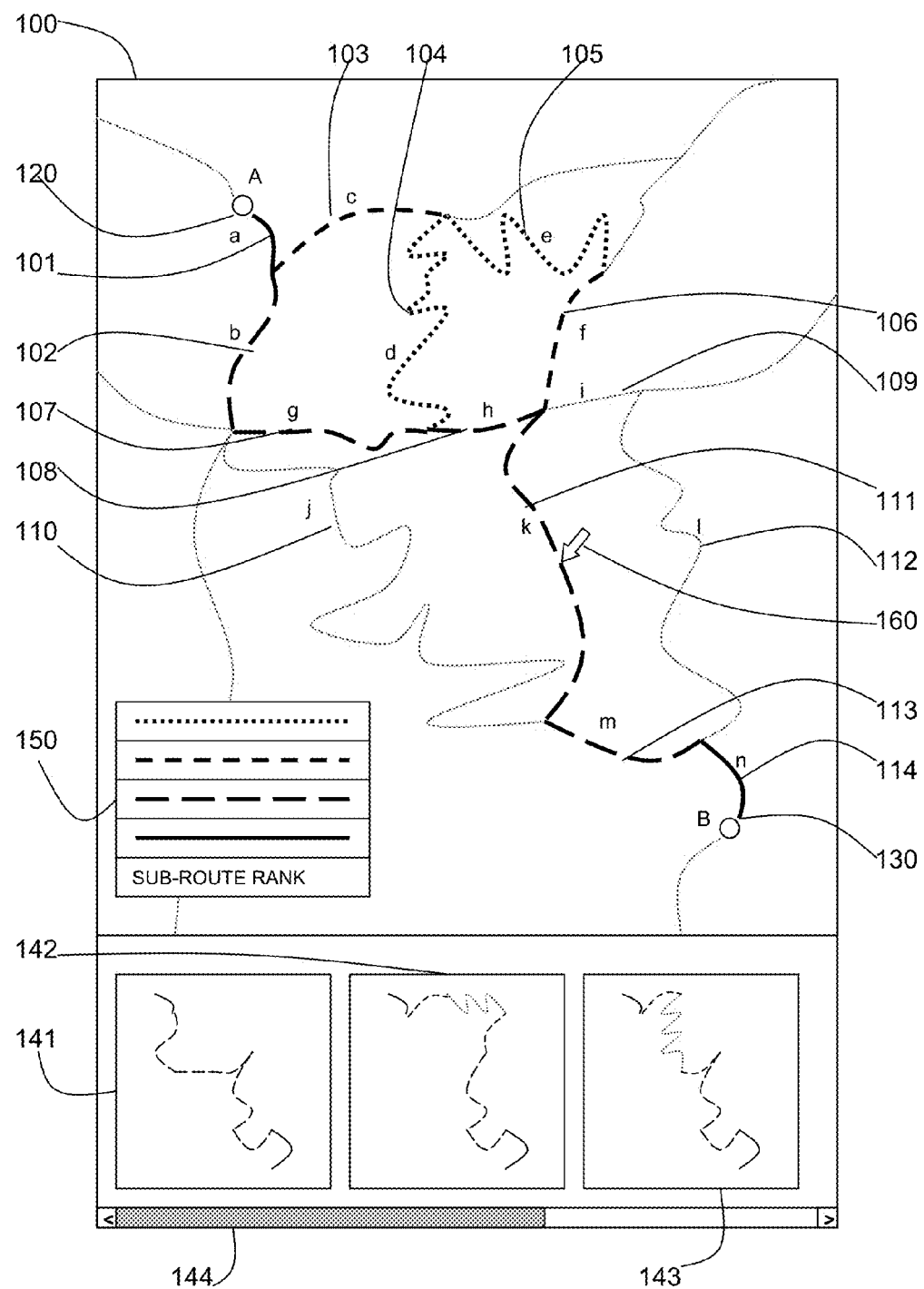
FIG. 1B is a representation of a user display showing a visualization of narrowed shared routes in accordance with an aspect of the present invention.

Referring to FIG. 1B, a refinement of the display 100 of the results is shown. A user input device, such as a mouse pointer 160, is used to select a sub-route. In the illustrated example, the selected sub-route is k 111. Any routes which do not include this sub-route are eliminated from the results displayed. The remaining sub-routes are re-aggregated according the new, drilled down, results.

In the illustrated example, this eliminates previous sub-routes: j 110, i 109, and l 112 from the visualization.

Displays of individual route results 141-143 show the selected sub-route k 111 as highlighted so that the user can readily identify the selected sub-route. Again, the individual route results 141-143 may be ranked by a function. For example, the individual route results 141-143 may be ranked by summing the scores of their sub-routes. The ranking of the individual route results may change due to the sub-route selection.

The drill down of results can be a positive filter such that all result routes must include the selected sub-route, or a negative filter such that all result routes must not include the selected sub-route.

In the embodiment shown in FIGS. 1A and 1B, the user specifies a query in the form of a start and end point for required route results.

In another embodiment, a user is not required to specify a specific navigational query. The system may display to the user a map with a route-cloud and the user could start his search session only by selecting a sub-route for drill down. The individual route results are only restricted to contain (or not contain) the selected sub-route.

The result score basis for the representation of sub-routes in the route-cloud has the ability to be personalized for the user, for example, using his own routes, using preferences such as most direct route, scenic route, faster roads, etc., and using previous searches. The representation can also be personalized, for example for colour schemes, to better visualize the route-cloud.

The route-cloud contains multiple routes from sources such as other users or defined in the system, and displayed on a single map. The sub-routes used by one or multiple routes are represented according to a scoring or ranking basis.

Each sub-route is aggregated or collected from all the routes it is part of. The sub-route is then given a score by any defined scoring function. The following are possible scoring bases for sub-route representation:
  Sub-route popularity: counting the number of times each sub-route appears in the result map routes.

Sub-route uniqueness: a sub-route that appears more in route maps associated with the user's route maps and less in other users.

Sub-routes that are more important.

Sub-routes whose path fits the user's profile better (for example, a raw path may be more fitting for biking, or a calm path may be more suitable for handicapped individuals).

Sub-routes that the user had not yet visited himself.

Scenic sub-routes (as rated by users, or passing scenic locations).

Faster sub-routes (based on the speed limit of the road of the sub-route).

Sub-routes with through high crime areas, particularly in an inner-city context.

Any combination of the above.

Any other aggregation by collaborative filter algorithm.

The representation of the sub-routes is varied to reflect the relative scores of the sub-routes. For example, a popular sub-route—one which is used in many routes—is colored green and its line may be heavy weighted (bold, with large width) and represented on the map as a continues, non-dashed line. A non-popular sub-route—one that belongs to only a single route where the result is made out of many routes—is colored red, it's line light weighted and represented on the map as a dashed line.

Each sub-route may be selected by a user on the display, for example, by pointing and clicking on a sub-route with a pointer device such as a mouse. This selection results in a narrowing or drill-down of the results displayed. The routes not matching this sub-route, meaning they do not include the sub-route, are eliminated from the results and the cloud is re-calculated over the new result set. The remaining sub-routes are aggregated according to the new result set and the sub-routes represented by their new aggregated score.

The drill-down process helps the user narrow the search in one click or a touch on a touch screen, without typing a complex text query which might lead to a different outcome (due to spelling errors, for example).

Personalizing a route-cloud display includes the ranking or scoring of the results and the way the results are displayed.

As an example of personalized ranking, a user planning a trip might want to visit new places. The application uses a user profile to find previously shared routes and take under account the routes leading to places he has already visited. Those scores would be lowered, allowing the user to view new places more clearly on the map.

In another example, if the user is planning a trip with a couple of friends, their profiles could come into account as well, allowing a collaborative route-cloud.

The visualization can also be personalised. Each user might find different colors clearer to see. This especially applies to color-blind people. The user profile may contain a color-pallet for a user to select which colors will be used for the sub-routes on the map.

Figure 2:
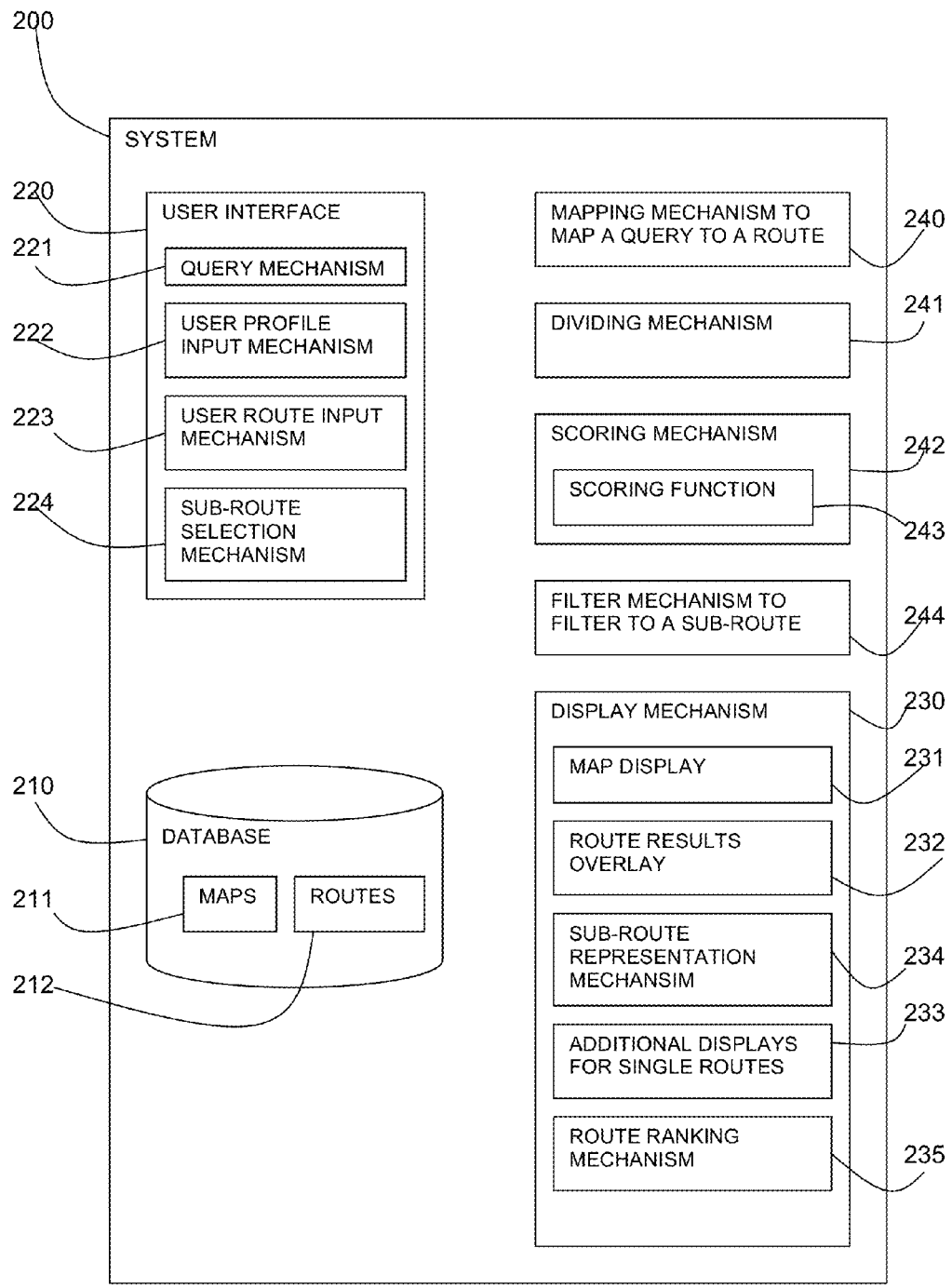
FIG. 2 is a block diagram of a system in accordance with the present invention.

Referring to FIG. 2, a block diagram shows a system 200 for collaborative route display. The system 200 includes a database 210 of maps 211, and users' routes 212 including the user's own previously used or input routes.

The system includes a user interface 220 including a query mechanism 221 for querying the maps 211 to show a required route or to show a map of a required area with all routes in the area. The user interface 220 also includes a user profile input mechanism 222 for inputting user preferences for the sub-route scoring and representation. The user interface 220 also includes a user route input mechanism 223 for inputting a user's own routes for other users to use and for reference. The user interface 220 also includes a sub-route selection mechanism 224 for drilling down on a sub-route or for eliminating a sub-route. The action of sub-route selection, either as a positive filter or a negative filter, may be set by the user in the user profile or may be a system global configuration for all users.

Inputting of users' routes on a map for collaboration may use any suitable form of data input. An example format is Keyhole Markup Language (KML) which is an XML-based language schema for expressing geographical annotation and visualization on web-based maps. Another example is, GPS Exchange Format (GPX) which may be used which is an XML schema for describing GPS data between software applications in which GPX can be used to describe waypoints, tracks and routes.

The query mechanism 221 may include a route input, for example, from a first place to a second place, and optionally via one or more other places. Alternatively, the query mechanism 221 may include a map area selection for all routes in the area.

The system 200 includes a mapping mechanism 240 to map a query to a route and a dividing mechanism 241 to divide a route into sub-routes. A scoring mechanism 242 aggregates sub-routes from all route results and scores them according to a scoring function 243. Multiple different scoring functions 243 may be provided and selected by a user preference.

A filter mechanism 244 is also provided to filter results by a selected sub-route. The filter mechanism 244 may carry out a facet filter where routes have defined sub-route facets. The filter mechanism 244 may be a positive filter in filter to results including a selected sub-route or a negative filter to filter results to not include the selected sub-route.

A display mechanism 230 provides a display of a map 231 of an area, including the queried places if specified, with an overlay 232 showing aggregated users' routes 212.

The display mechanism 230 includes a sub-route representation mechanism 234 for displaying sub-routes according to the representation suitable for the score of the sub-route and according to user preferences.

The display mechanism 230 may include additional displays 233 for displaying separate routes. A route ranking mechanism 235 may be provided to rank the individually displayed routes.

Figure 3:
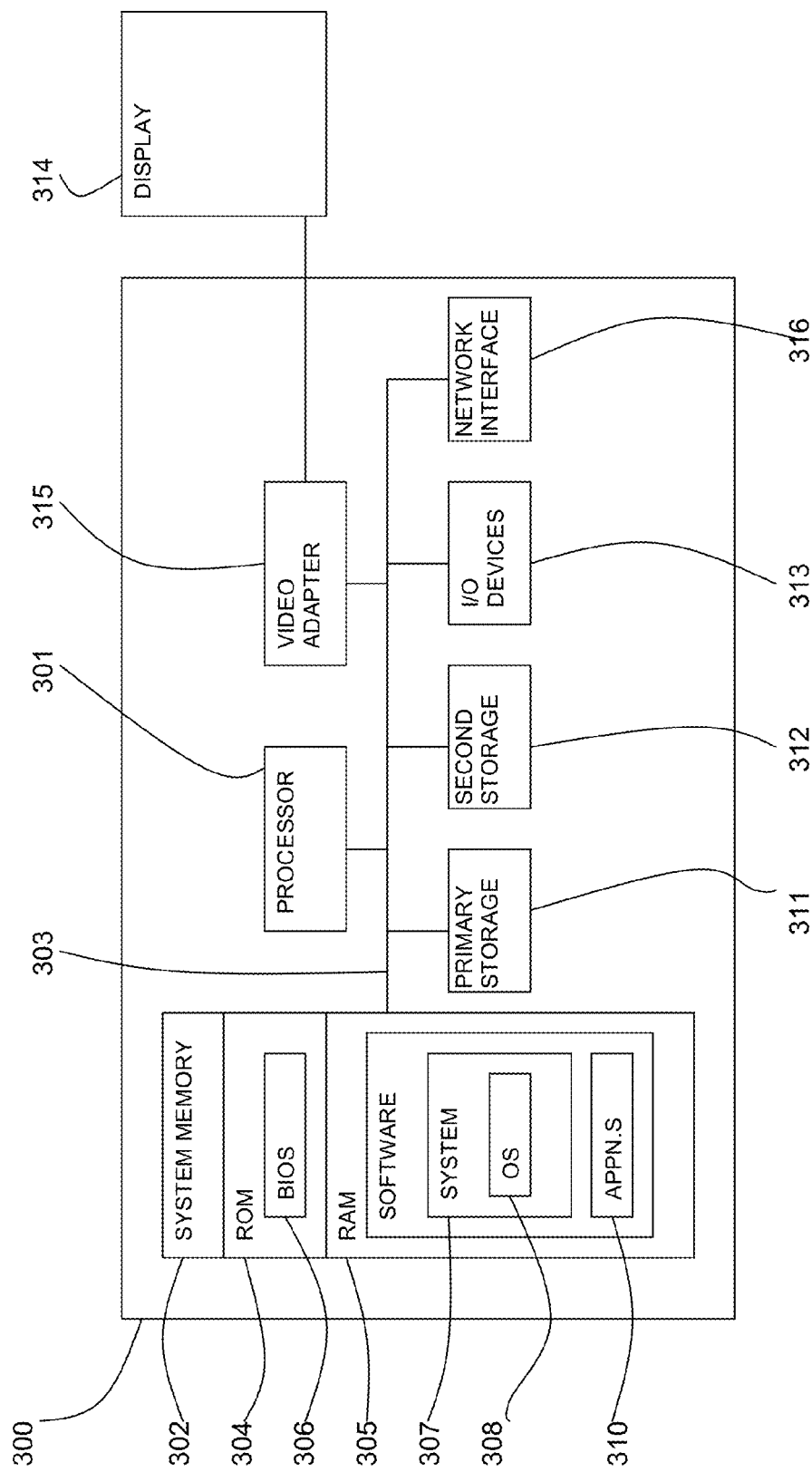
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
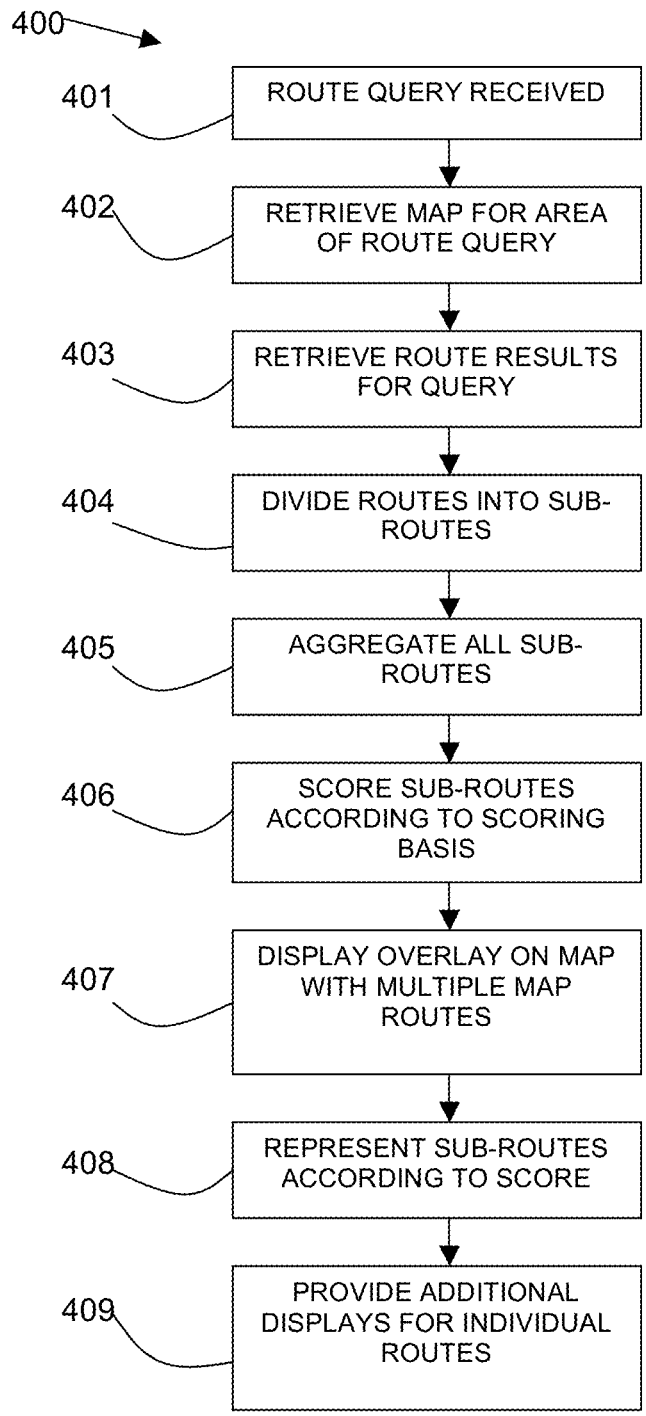
FIG. 4 is a flow diagram of a method in accordance with the present invention.

Referring to FIG. 4, a flow diagram 400 shows a method of displaying shared routes. A user query is received 401 and a map is retrieved 402 including the area of the query. The query may be for an area of a map or may be for a route with one or more specified places. All user route maps are retrieved 403 that satisfy the query.

The method divides 404 all routes into sub-routes and aggregates 405 the different sub-routes from the query result map routes. Each sub-route is scored 406 according to a scoring function. The scoring function may be a collaborative filtering algorithm to score each sub-route. Additional score refinements can be applied which may be determined by the user profile.

An overlay is displayed 407 on the map with the multiple map routes of the result with sub-routes represented 408 according to their scoring.

Additional displays may be provided 409 to display each map route result separately to the user. Further details of this aspect are shown in the flow diagram of FIG. 6.

Figure 5:
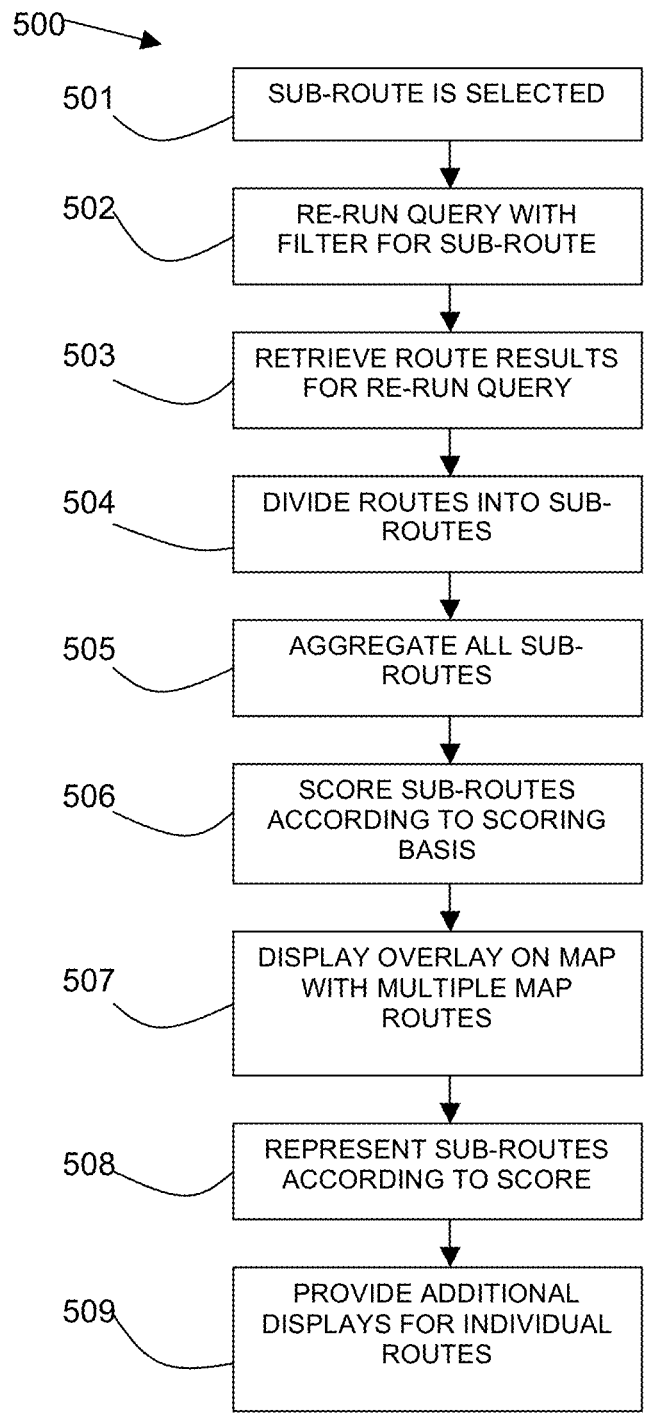
FIG. 5 is a flow diagram of a method in accordance with an aspect of the present invention.

Referring to FIG. 5, a flow diagram 500 shows a method of drilling down on a sub-route. A sub-route is selected 501 for "drill-down" by a user clicking on a sub-route on the map.

The initial user query is re-run 502 together with a facet filter of the selected sub-route to obtain only map routes that include the selected sub-route or to obtain only map routes that do not include the selected sub-route. All user map routes that satisfy the refined query are retrieved 503.

As with the general query method, the method divides 504 all routes into sub-routes and aggregates 505 the different sub-routes from the query result map routes. Each sub-route is scored 506 according to a scoring function. The scoring function may be refined by the user profile and the sub-route facet.

An overlay is displayed 507 on the map with the multiple map routes of the result with sub-routes represented 508 according to their scoring.

Additional displays may be provided 509 to display each map route result separately to the user. The sub-route selected for the drill-down by the user is further highlighted on each map route result of each individual displayed route.

The process of selecting a sub-route and refining the results can be iterative. The user may select a sub-route that the system refreshes the display, then the user continues to select another sub-route, and so on.

Figure 6:
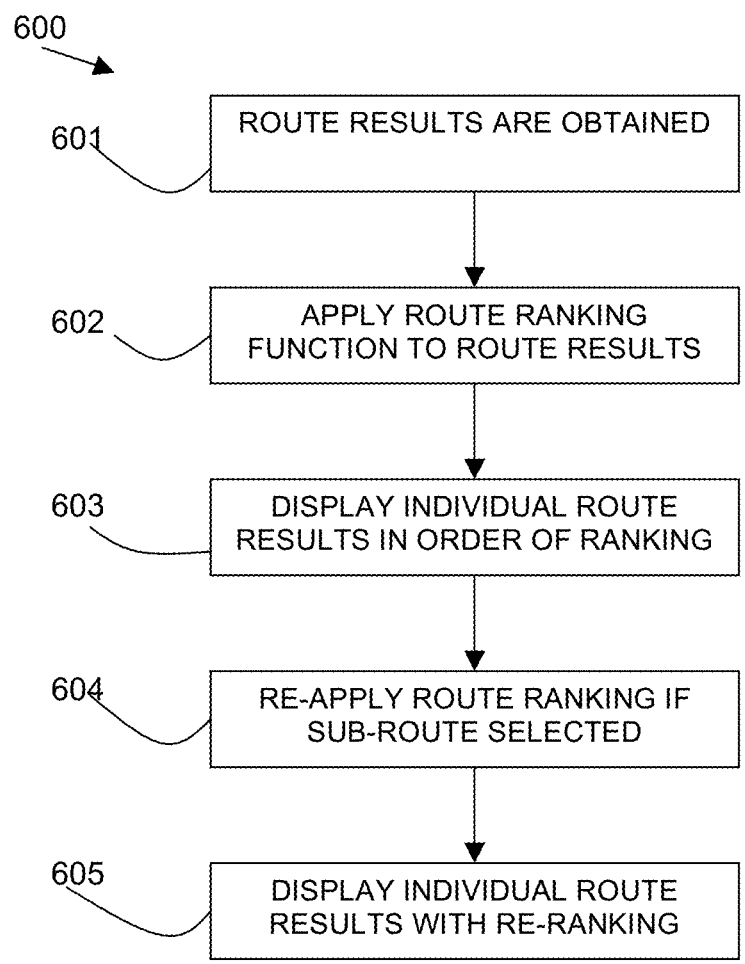
FIG. 6 is a flow diagram of a method in accordance with a further aspect of the present invention.

FIG. 6 is a flow diagram 600 showing the method of display of individual route results. The steps of the process of FIG. 4 are carried out resulting in a display of overlaid route results on a map. The route results are obtained 601 and a route ranking function is applied 602. This ranks the entire route of the query. The individual route results are displayed 603 in the order of the ranking. An example of a ranking function, is by summing the scores of the sub-routes which make up a route.

Another example, is that a route that contains sub-routes that the user visited in the past according to the user profile may be preferred. As a further example, shorter routes (as defined by the sum of sub-route lengths (distance)), will be preferred.

If a user selects a sub-route as described in FIG. 5, the route ranking function is re-applied 604 based on the narrowed results filtered by the selected sub-route. The re-ranked individual route results are displayed 605.

The audience for such an application which collaborative route sharing with a route-cloud includes the following:

Mapping sites could benefit from such service (GoogleMaps, OpenStreetMap, Sanoodi, Wayfaring and more).

Travellers using the public knowledge to plan their trip.

Travel agencies reducing the time a trip planning takes.

Merchants could benefit from analyzing the public traffic, finding new spots for their businesses.

Advertisers could improve advertisement exposure by locating new spots.

The above description relates to roads; however, the routes may be walking or hiking routes, or leisure routes such as ski-ing or bicycling routes, or routes requiring other forms of transport such as train, aeroplane, boat, etc.

For example, a train network may be broken down into sub-routes with different properties which can be shared by users. For example, scoring bases may be speed of train, routes prone to delay, comfort of train, catering facilities, luggage/bicycle accommodation, etc.

As another example, a piste map of a ski resort may use such an application to visualize the pistes and a users can share information on the pistes and recommend routes based on difficulty, or quality of surface, time of day or season, etc.

A visualization of shared routes may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for visualizing shared route information, comprising:

managing by a server, a database including a plurality of user-provided routes uploaded to the server by a plurality of different users;

receiving a query from a user;

retrieving multiple user-provided routes matching the query from the database;

dividing each retrieved route into sub-routes, wherein a sub-route is a portion of a route between intersections with other routes;

aggregating the sub-routes across the retrieved routes;

scoring each aggregated sub-route according to a defined scoring basis, dependent on the user-provided routes; and displaying the aggregated sub-routes of the multiple retrieved routes overlaid on a map, such that each sub-route is displayed with at least one attribute representing its score;

wherein the receiving, retrieving, dividing, aggregating, scoring and displaying steps are implemented in either of:

a) computer hardware; and b) computer software embodied in a non-transitory, tangible, computer-readable storage medium.

2. The method as claimed in claim 1, further comprising:
selecting a displayed aggregated sub-route; and
filtering the retrieved routes based on the selected aggregated sub-route and displaying the filtered routes.

3. The method as claimed in claim 2, wherein filtering carries out a faceted search, wherein a route has facets of sub-routes within it.

4. The method as claimed in claim 1, wherein:
the defined scoring bases include one or more of the following: sub-route popularity; sub-route used in user's own routes; sub-route importance; sub-route speed; sub-route fits user's preferences; sub-route scenic-ness; sub-routes not visited by the user.

5. The method as claimed in claim 1, including mapping the query to stored routes in a data repository.

6. The method of claim 1, wherein the scoring basis is defined by the user providing the query.

7. The method of claim 1, wherein scoring each aggregated sub-route comprises scoring based on a number of retrieved routes including the sub-route.

8. The method of claim 1, wherein displaying the aggregated sub-routes comprises displaying each sub-route with a line width, style or color dependent on the score of the sub-route.

9. The method of claim 1, wherein displaying the aggregated sub-routes comprises displaying each sub-route with a score label next to the sub-route.

10. A computer program product for visualizing shared route information, the computer program product comprising:
a non-transitory computer readable medium;
computer program instructions operative to:
manage a database of user-provided routes;
receive a query from a user;
retrieve multiple user-provided routes matching the query from the database;
divide each retrieved route into sub-routes, wherein a sub-route is a portion of a route between intersections with other routes;
aggregate the sub-routes across the retrieved routes;
score each aggregated sub-route according to a defined scoring basis, dependent on the user-provided routes; and
represent each aggregated sub-route in a display overlaid on a map according to a score of the sub-route;
wherein said program instructions are stored on said computer readable medium.

11. A system for visualizing shared route information, comprising:
a data repository storing map information and user-provided routes uploaded to the server by a plurality of different users;
a computer-based query input mechanism to receive route queries; and
a processor configured to retrieve from the repository routes matching a query received by the query input mechanism, to determine sub-routes included in the matching routes, wherein a sub-route is a portion of a route between intersections with other routes, to assign scores to the determined sub-routes according to a defined scoring basis dependent on the matching routes; and to prepare for display the determined sub-routes, such that each sub-route in the display is represented according to a relative score of the sub-route.

12. The system as claimed in claim 11, further comprising:
a user selection mechanism for selecting a displayed sub-route; and
a filtering mechanism to filter the route results based on the selected sub-route.

13. The system as claimed in claim 12, wherein the filtering mechanism carries out a faceted search, wherein a route has facets of sub-routes within it.

14. The system as claimed in claim 11, including:
the data repository includes a history of a user's own routes and wherein the defined scoring basis is dependent on the history.

15. The system as claimed in claim 11, wherein:
the defined scoring bases include one or more of the following: sub-route popularity; sub-route used in user's own routes; sub-route importance; sub-route speed; sub-route fits user's preferences; sub-route scenic-ness; sub-routes not visited by the user.

16. The system as claimed in claim 11, wherein:
representing each sub-route relative to other sub-routes includes one or more of: dashing of lines with different lengths of dashes; colour of lines; saturation or opacity of lines; width of lines; style of lines; label next to sub-route.

17. The system of claim 11, wherein the processor is configured to assign scores to the aggregated sub-routes using a user selected scoring basis defined by the user providing the query.

18. The system of claim 11, wherein the processor is configured to assign a score to each aggregated sub-route based on a number of retrieved routes including the sub-route.

19. The system of claim 11, wherein the processor represents each sub-route with a line width, style or color dependent on the score of the sub-route.

20. The system of claim 11, wherein the processor represents each sub-route with a score label next to the sub-route.

* * * * *